United States Patent
Chang

(10) Patent No.: US 7,430,012 B2
(45) Date of Patent: *Sep. 30, 2008

(54) FOCUSING AUXILIARY DEVICE OF IMAGE-CAPTURING APPARATUS

(75) Inventor: Shan-Wen Chang, Changhua County (TW)

(73) Assignee: Transpacific Plasma, LLC, Taipei (TW)

( * ) Notice: Subject to any disclaimer, the term of this patent is extended or adjusted under 35 U.S.C. 154(b) by 680 days.

This patent is subject to a terminal disclaimer.

(21) Appl. No.: 10/862,283

(22) Filed: Jun. 7, 2004

(65) Prior Publication Data

US 2005/0036058 A1 Feb. 17, 2005

(30) Foreign Application Priority Data

Aug. 13, 2003 (TW) .............................. 92122300 A

(51) Int. Cl.
*H04N 5/225* (2006.01)
*G03B 17/00* (2006.01)

(52) U.S. Cl. .................. 348/375; 396/419; 396/422

(58) Field of Classification Search ................ 348/373, 348/374, 375, 376; 396/138, 139, 140, 419–428; 359/441, 442

See application file for complete search history.

(56) References Cited

U.S. PATENT DOCUMENTS

| | | | | |
|---|---|---|---|---|
| 3,263,589 A | * | 8/1966 | Rice | 396/89 |
| 3,601,028 A | * | 8/1971 | Tertocha | 248/222.14 |
| 4,348,097 A | | 9/1982 | Sippel | |
| 5,028,941 A | * | 7/1991 | Sohn | 348/376 |
| 5,416,544 A | * | 5/1995 | Stapleton | 396/544 |
| 5,576,781 A | * | 11/1996 | Deleeuw | 396/6 |
| 6,917,757 B1 | * | 7/2005 | Chang | 396/139 |

FOREIGN PATENT DOCUMENTS

| | | | |
|---|---|---|---|
| JP | 2001-042419 | * | 2/2001 |
| TW | 523636 | | 3/2003 |

* cited by examiner

*Primary Examiner*—NgocYen T. Vu
*Assistant Examiner*—Christopher K Peterson
(74) *Attorney, Agent, or Firm*—Workman Nydegger

(57) ABSTRACT

A focusing auxiliary device of an image-capturing apparatus includes a base and an extension rod. The base is arranged on the image-capturing apparatus. The extension rod is coupled to and movable relative to the base for sustaining against a supporting surface so as to keep the lens set of the image-capturing apparatus at a fixed distance from an object to be photographed. By marking graduations on the extension rod, the focusing distance from the image-capturing apparatus to the object can be realized at the same time.

20 Claims, 8 Drawing Sheets

FOCUSING AUXILIARY DEVICE OF IMAGE-CAPTURING APPARATUS

FIELD OF THE INVENTION

The present invention relates to a focusing auxiliary device of an image-capturing apparatus, and more particularly to a focusing auxiliary device of an image-capturing apparatus for assuring a precise focusing distance.

BACKGROUND OF THE INVENTION

Referring to FIG. 1, a typical camera 1 comprises three essential parts, i.e. a main body 11, a lens unit 12 and an image-forming unit (not shown). The lens set 12 comprises a plurality of delicate lens disposed in the front of the main body 11. By means of the lens set 12, the light reflected from a photographed object 2 is focused on the image-forming unit for exposure. For example, the image-forming unit can be a film for a film-type camera or a charge-coupled device (CCD) for a digital still camera.

As is understood, the definition of a photograph taken by a camera is largely effected by the focusing operation of the camera. The object distance should be within an acceptable focusing area of the camera, and the camera should be stabilized to well perform the focusing operation.

When the focusing range, i.e. the object distance d between the camera 1 and the object 2, is very short, for example 20~100 mm, the definition ranges of a photograph varying with distances are shown in FIG. 2. In general, an effective focusing operation is done when a definition of at least 80% is achieved. Curves a and b show two photographing conditions where focusing distances are 70 mm and 30 mm, respectively. For Curve a where the object distance d is 70 mm, the allowable deviation for more than 80% definition is as narrow as within the range A. Once the object distance d is reduced to 30 mm, the even sharp curve b is rendered. In this case, the allowable deviation for more than 80% definition is as indicated by the range B, which is as narrow as several millimeters. Therefore, it is likely to result in an obscure photo image even if just a little vibration of the camera is done.

Conventionally, a tripod is used to improve the rocking problem, as shown in FIG. 3. The camera 1 is supported onto the top of the tripod 3 so as to exempt from being held with hands. The use of the tripod 3, however, is accompanied with undesired cumbersome, weighty and costly problems. Since the tripod 3 generally has height greater than a certain level, the photographed object 2 needs to be put on a raised platform 4 when a close-up shot is to be taken. Unfortunately, in some situations or locations, it is preferred not to move the object, e.g. when a little bug resting on the grass is to be photographed. Moreover, it is sometimes hard to find a suitable place for the tripod to stand.

SUMMARY OF THE INVENTION

Therefore, it is an object of the present invention to provide a focusing auxiliary device of an image-capturing apparatus, especially suitable for close-up shots.

It is another object of the present invention to provide a focusing auxiliary device of an image-capturing apparatus without any separate accessory like a tripod.

In accordance with a first aspect of the present invention, there is provided a focusing auxiliary device of an image-capturing apparatus. The focusing auxiliary device comprises a base and an extension rod. The base is arranged on the image-capturing apparatus. The extension rod is coupled to and movable relative to the base for estimating a distance from the image-capturing apparatus to an object to be photographed.

In an embodiment, the extension rod has thereon graduations for indicating the distance from the image-capturing apparatus to the object to be photographed.

In an embodiment, the base includes a track engaging with the extension rod, and a pointer for indicating a current graduation during the extension rod slides along the track.

In an embodiment, the base is a housing of the image-capturing apparatus, and the pointer is arranged at a fixed position on the housing.

In an embodiment, the base is a lens housing of the image-capturing apparatus, and the pointer is marked at a fixed position on the lens housing.

In an embodiment, the track has a rack structure, and the extension rod has a resilient protrusion conforming to the rack structure to allow the extension rod to move along the track by an external force, and be stuck at a designated position when the external force is removed.

In an embodiment, the focusing auxiliary device further comprises a retaining bolt engaging with a threaded retaining hole of the extension rod, and optionally screwed tight to further stick the extension rod at the designated position.

In accordance with a second aspect of the present invention, there is provided a focusing auxiliary device of an image-capturing apparatus. The focusing auxiliary device comprises a base and an extension rod. The base is arranged on the image-capturing apparatus. The extension rod is coupled to and movable relative to the base to become more protrusive than a lens set of the image-capturing apparatus for sustaining against a supporting surface so as to keep the lens set of the image-capturing apparatus at a fixed distance from an object to be photographed.

In an embodiment, the supporting surface is a surface where the object is to be photographed is placed.

In an embodiment, the focusing auxiliary device further comprises a retaining member. The fixed distance is adjustable by differentially moving the extension rod relative to the base, and sticking the extension rod at a designated position on the base with the retaining member.

In an embodiment, the retaining member includes a bolt engaging with a threaded hole of the extension rod for sticking the extension rod at the designated position when being screwed tight into the threaded hole.

In an embodiment, the extension rod has thereon graduations, and the base includes a pointer for indicating a current graduation representing a distance from the lens set to the supporting surface during the extension rod moves relative to the base.

In an embodiment, the base has thereon a rack structure, and the extension rod has a resilient protrusion conforming to the rack structure to allow the extension rod to move relative to the base by an external force, and be stuck at a designated position when the external force is removed.

In an embodiment, the extension rod has a rounded free end for protecting the sustaining surface from abrasion of the extension rod when the extension rod sustains against the supporting surface.

In an embodiment, the focal auxiliary device further comprises a protective sheath capping a free end of the extension rod for protecting the extension rod from abrasion of the supporting surface.

In accordance with a second aspect of the present invention, there is provided a focusing auxiliary device of an image-capturing apparatus. The focusing auxiliary device comprises a base and a plurality of extension rods. The base is arranged on the image-capturing apparatus and has thereon a plurality of tracks. The plurality of extension rods are coupled to and movable along the tracks, respectively, and protrude for sustaining against a supporting surface where the object to be photographed is placed so as to stabilize the image-capturing apparatus.

In an embodiment, the focal auxiliary device comprises three tracks and three extension rods.

In an embodiment, the extension rods are arranged to confine the object to be photographed therewithin.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
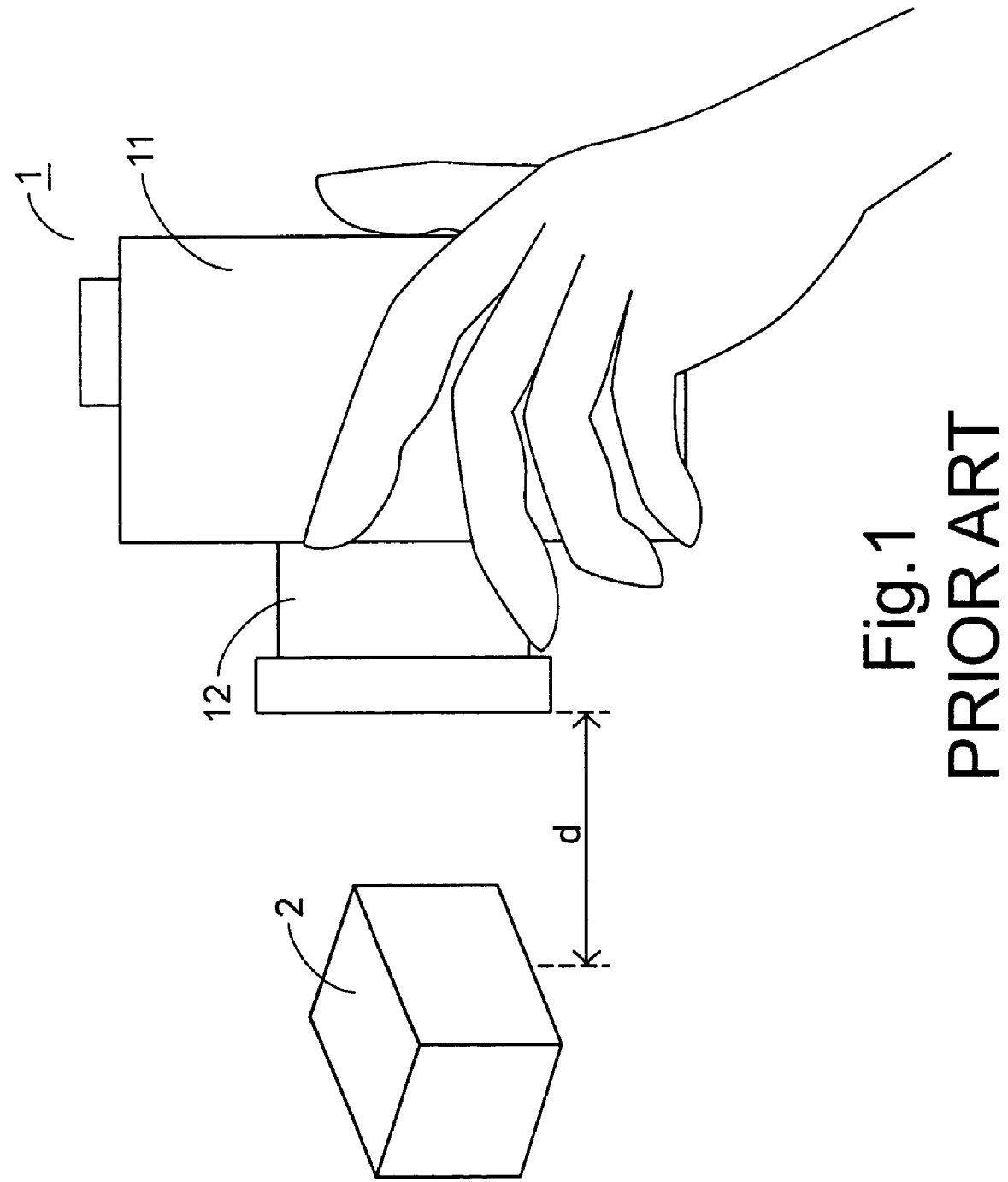
FIG. 1 is a schematic diagram illustrating a camera supporting with hands to take pictures.
Figure 2:
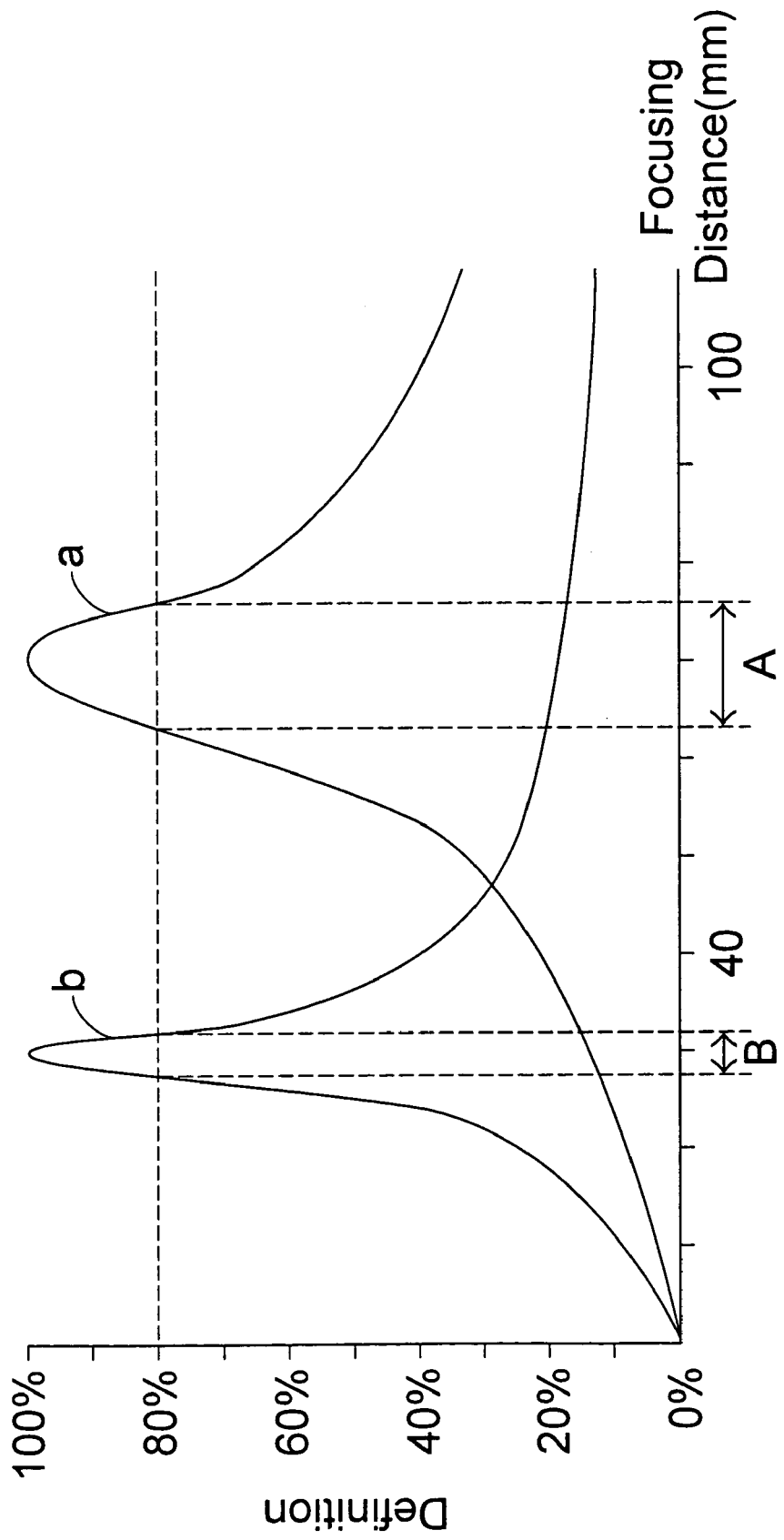
FIG. 2 is a definition vs. focusing-distance plot illustrating that the acceptable definition ranges of a photograph reduces with the decrease of the focusing distance.
Figure 3:
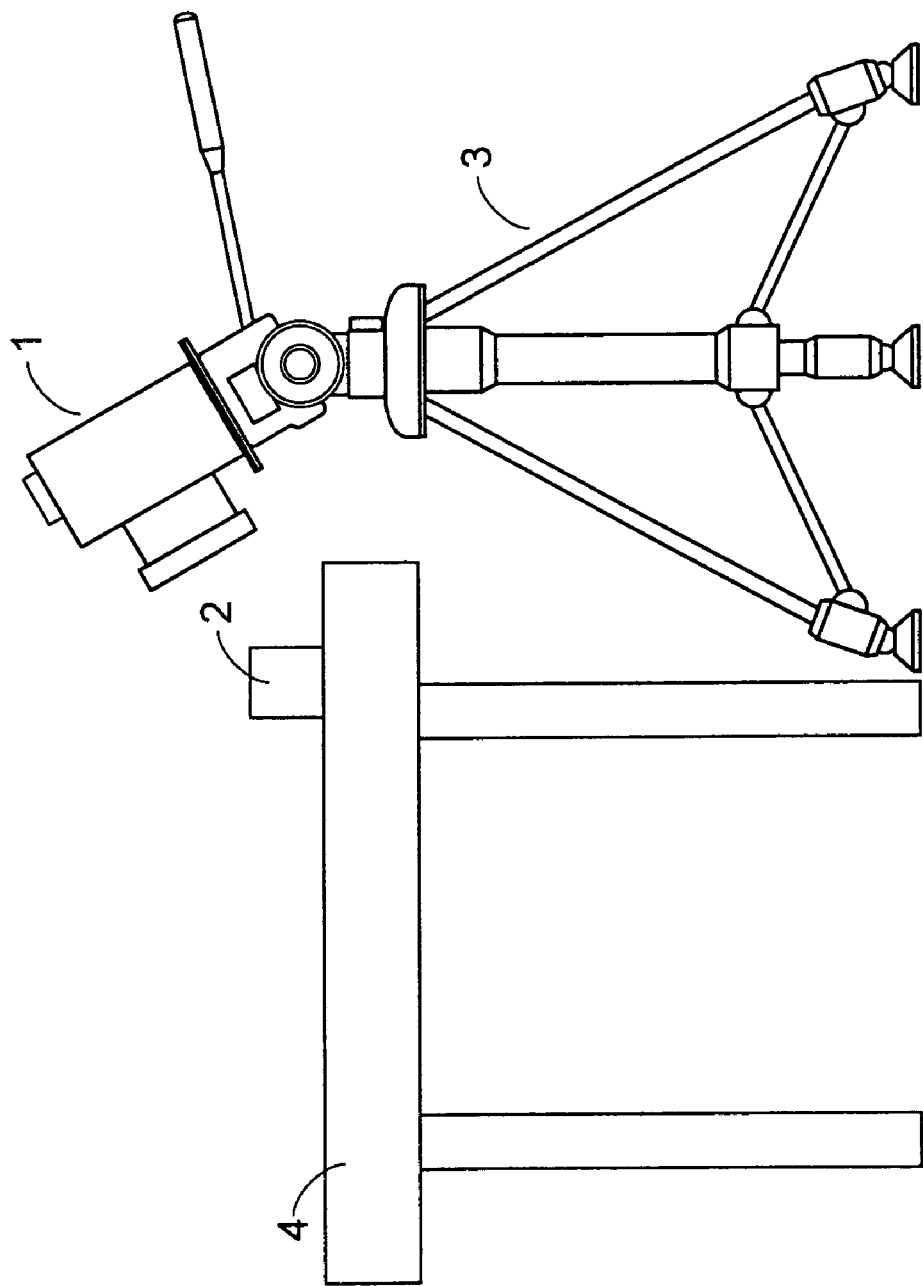
FIG. 3 is a schematic diagram illustrating the use of a tripod to alleviate the rocking problem occurring in the handheld mode.
Figure 4:
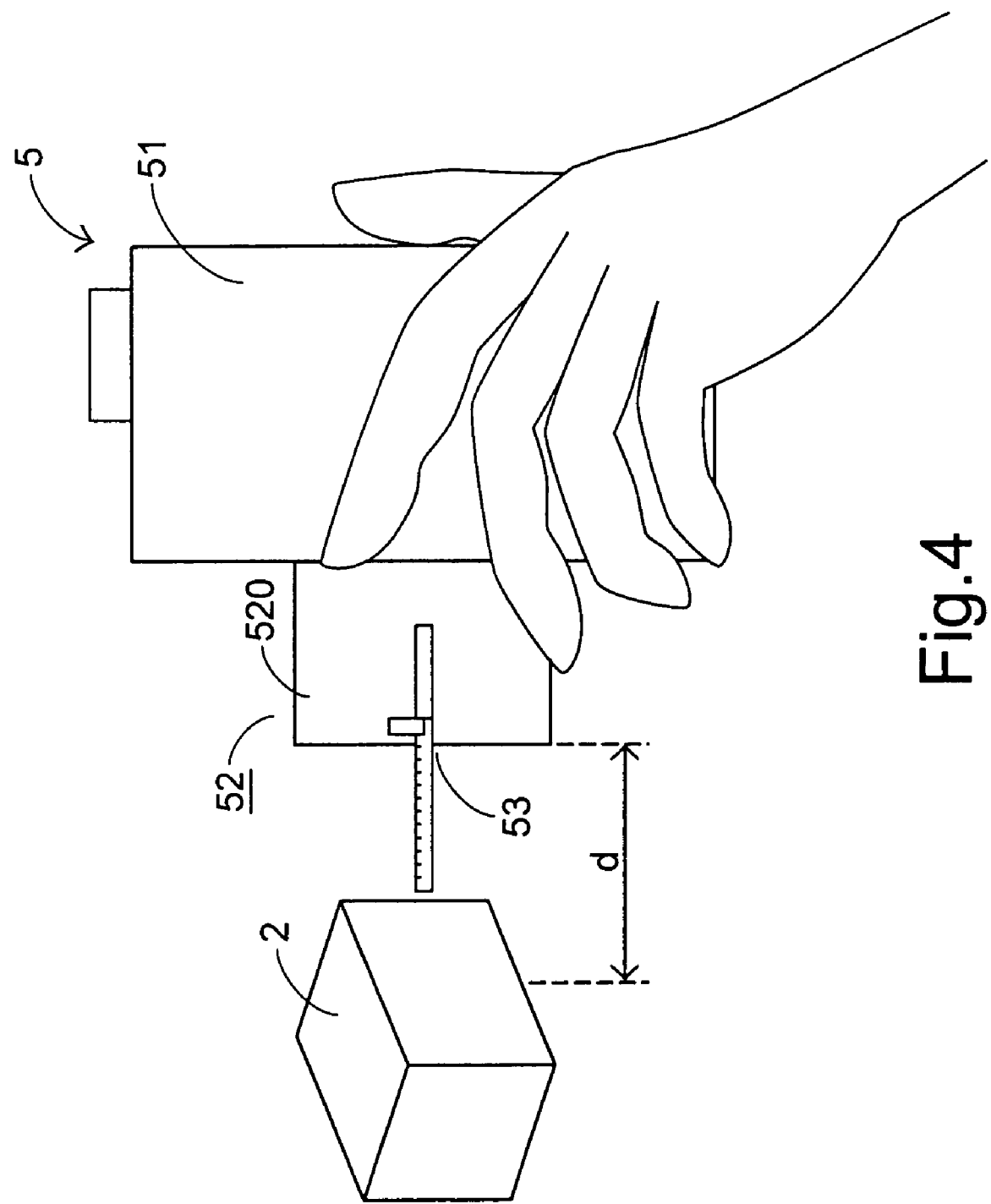
FIG. 4 is a schematic diagram illustrating a camera with a focusing auxiliary device according to a preferred embodiment of the present invention.
Figure 5:
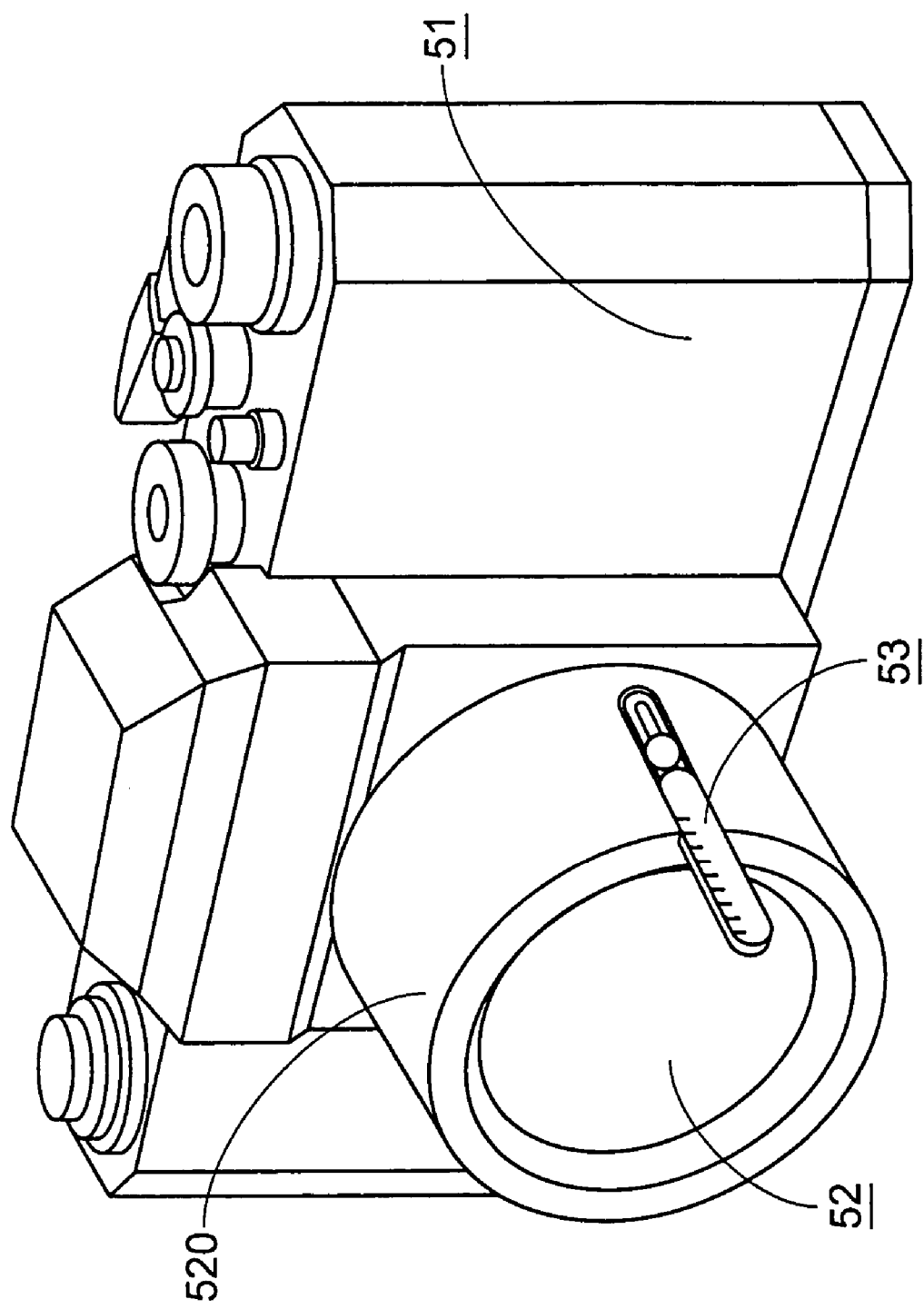
FIG. 5 is a perspective view of the camera of FIG. 4, schematically showing the arrangement of the focusing auxiliary device on the lens housing.
Figure 6:
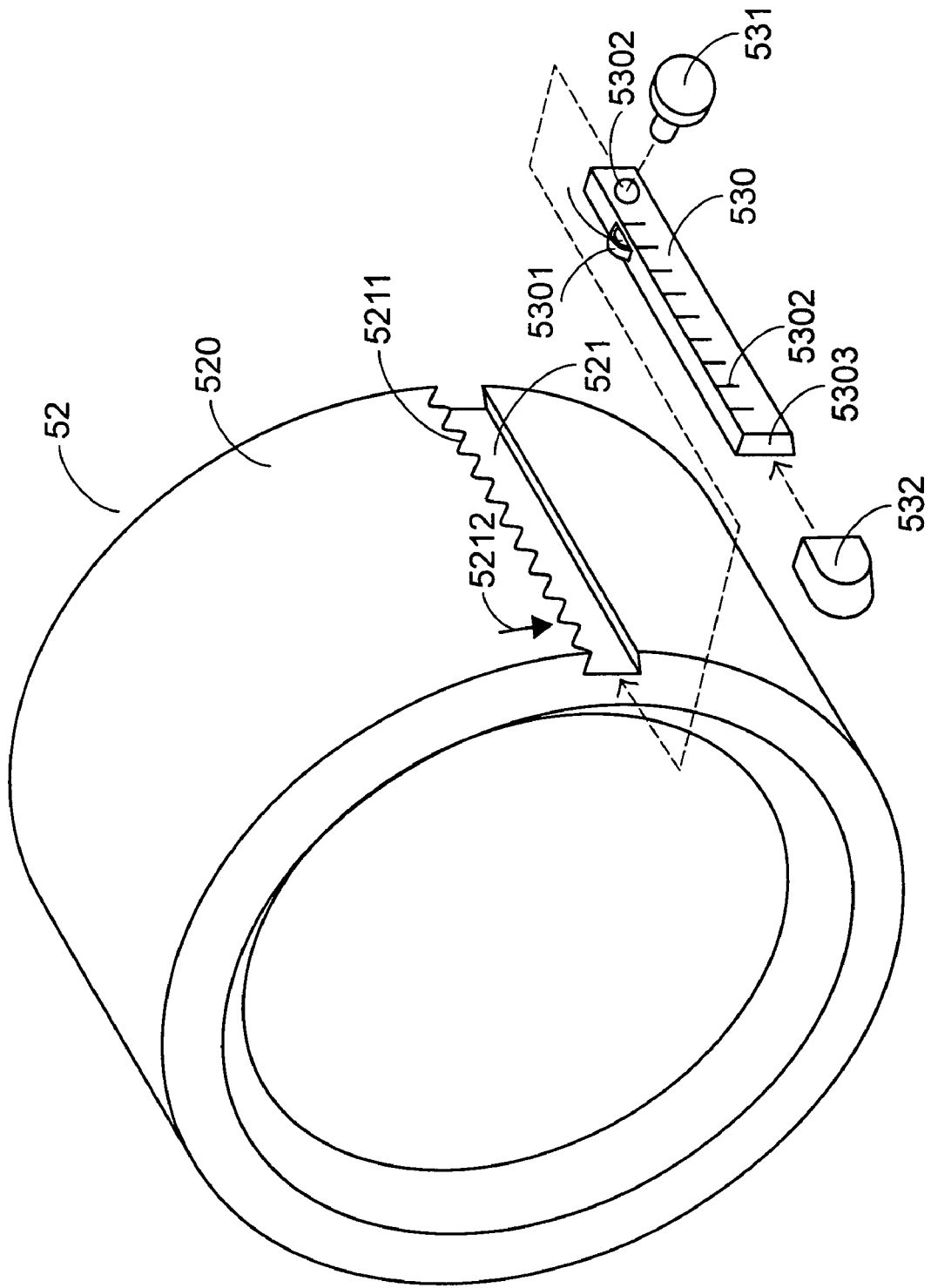
FIG. 6 is a partially resolving diagram of FIG. 5 schematically showing how the focusing auxiliary device is mounted to the lens housing.

Referring to FIGS. 4, 5 and 6, a camera with a focusing auxiliary device according to a preferred embodiment of the present invention is illustrated. The camera 5 comprises a main body 51, a lens unit 52 and a focusing auxiliary device 53. The focusing auxiliary device 53 is arranged on the housing 520 of the lens unit 52. The focusing auxiliary device 53 principally comprises an extension rod 530 and a track 521 created on the outer surface of the lens housing 520, as shown in FIG. 6. The track 521 has a rack structure 5211. The extension rod 530 has a resilient protrusion 5301 having a shape and size conforming to the rack structure 5211. In response to an external force exerted on the extension rod 530 to alternately engage and disengage the resilient protrusion 5301 and the rack structure 5211, the extension rod 530 moves along the track 521 to protrude from the lens housing 520. When the external force is removed, the extension rod 530 is stuck at a designated position. The extension rod 530 further has a threaded retaining hole 5302 at a rear end thereof. After the designated position is reached, a retaining bolt 531 is screwed tight into the retaining hole 5302 to securely stick the extension rod 530 at the designated position. On the other hand, the extension rod 530 can be completely detached from the track 521 when it is not in use, thereby facilitating the accommodation of the camera in the camera bag.

Figure 7A:
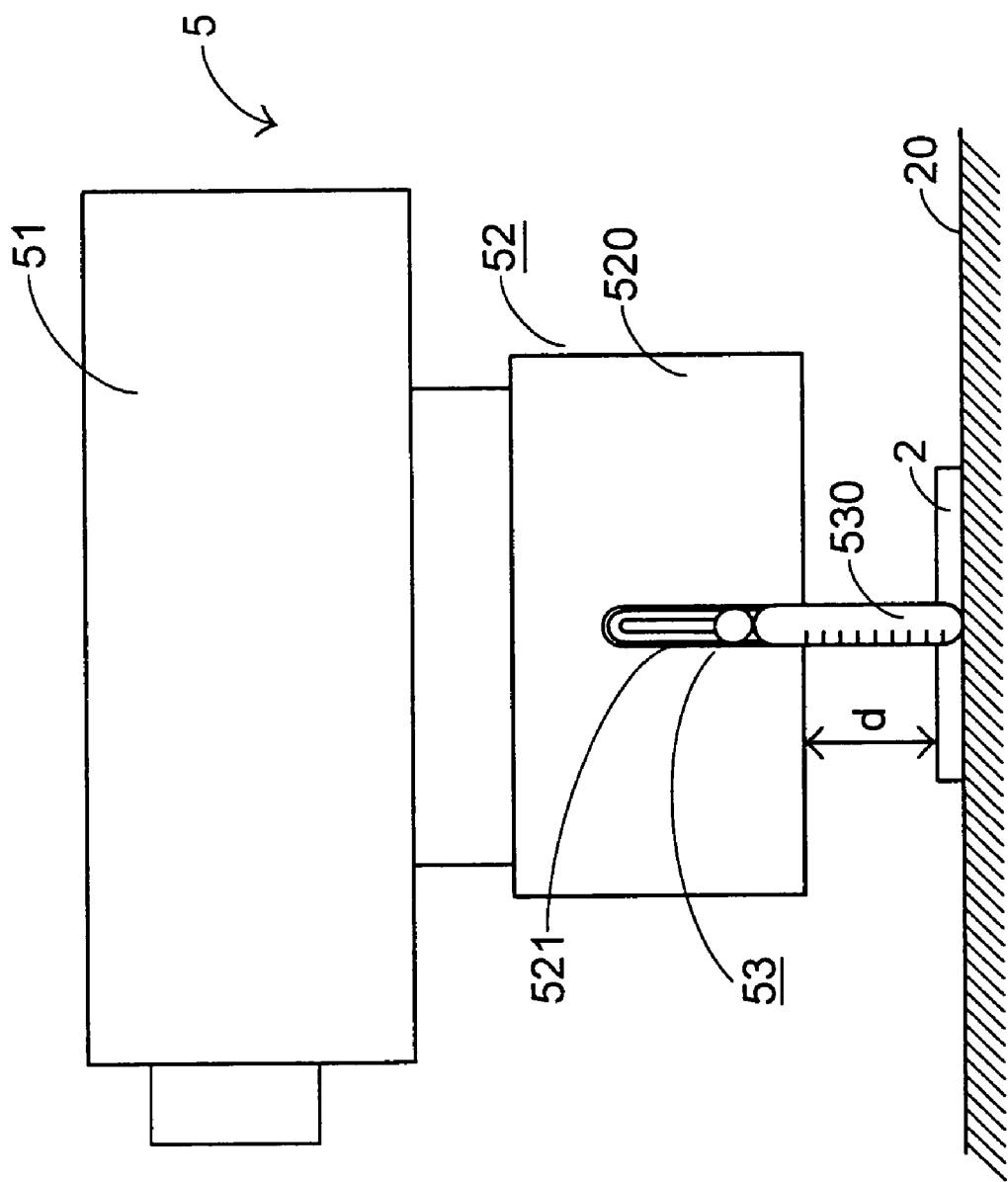
FIG. 7A is a schematic diagram illustrating how the focusing auxiliary device of FIG. 6 works with the camera.

The designated position is determined based on the focusing distance. The extension rod 530 locked at the designated position and protruding from the lens housing 520 facilitates the stabilization of the camera by sustaining against a supporting surface 20 where the object 2 is to be photographed is placed, as shown in FIG. 7A. This function is particularly advantageous to close-up shots. In order to protect the extension rod 530 and the supporting surface from abrasion of each other when the extension rod 530 sustains against the supporting surface, the free end 5303 of the extension rod 530 is preferably rounded or capped with a protective sheath 532 (FIG. 6). Alternatively, more than one set of extension rods and tracks can be arranged on the lens housing to constitute a plane on the supporting surface so as to further stabilize the camera.

Figure 7B:
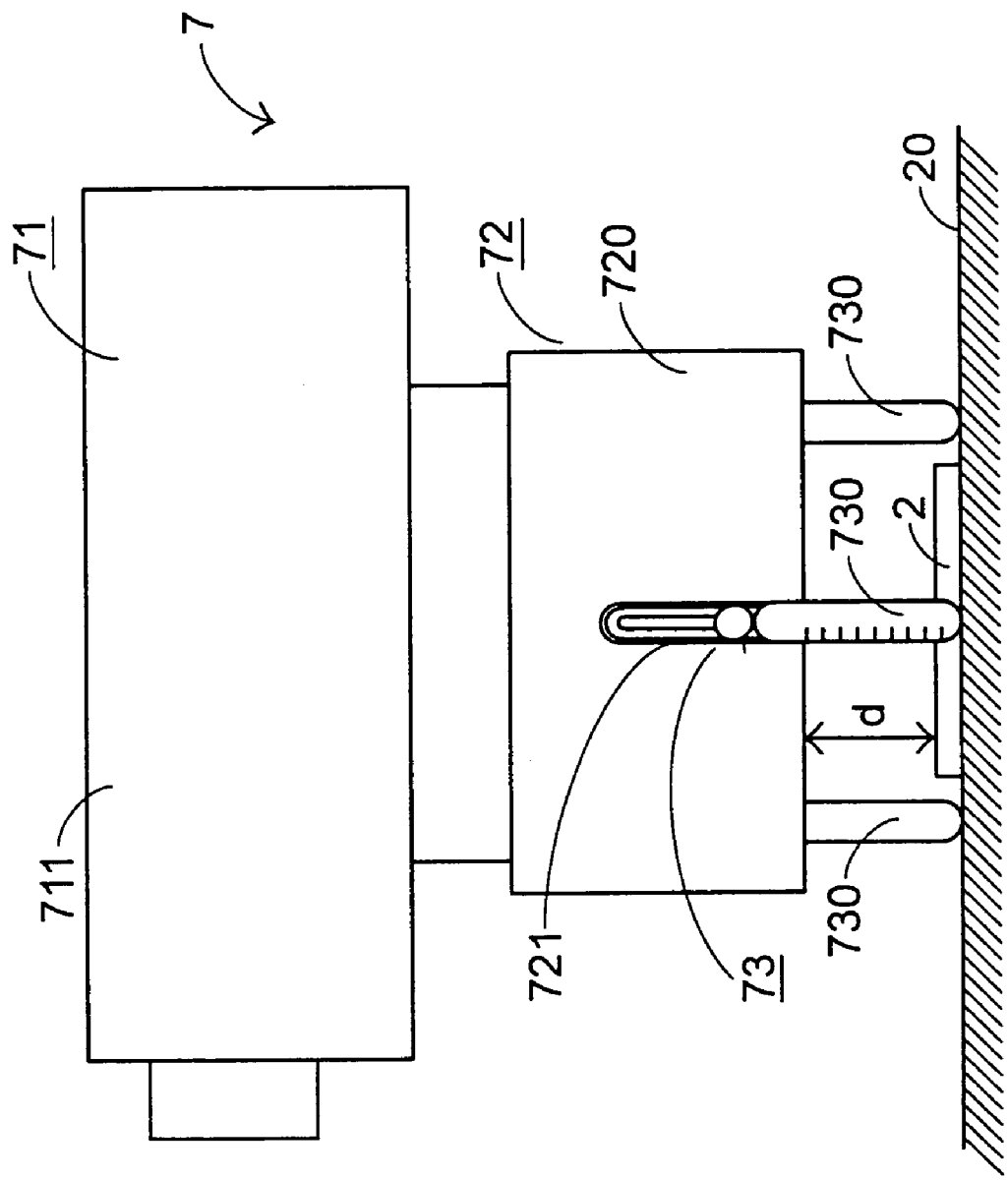
FIG. 7B is a schematic diagram illustrating a camera with a focusing auxiliary device according to another preferred embodiment of the present invention, and how the focusing auxiliary device works.

Referring to FIG. 7B, camera 7 having a focusing auxiliary device 73 comprising of three sets of extension rods 730 and tracks 721 is shown. Similar to the embodiment of FIG. 7A, the focusing auxiliary device 73 is arranged on the housing 720 of the lens unit 72 with the three tracks 721 created on the outer surface of the lens housing 720. By pulling the extension rods 730 outwards to sustain against the supporting surface 20, the camera can be stabilized, and the focusing distance d from the lens unit 72 to the object 2 positioned within the extension rods 730 can be kept constant. The extension rod 730 and tracks 721 in this embodiment can be designed to have similar structures to those described in FIG. 5, which are thus not intended to be described redundantly herein. Preferably but not necessarily, these extension rods 730 are arranged as a right triangle.

Moreover, the extension rod 530 or 730 and the lens housing 520 or 720 preferably have thereon graduation and pointer marks, as indicated by numeral references 5302 and 5212 in FIG. 7A, respectively. The pointer 5212 is arranged at a fixed position on the lens housing 520 for indicating a current graduation during the extension rod 530 slides along the track 521. By way of graduation indication, the focusing distance d from the camera 5 to the object 2 can be realized so as to assure of the position of the object 2 within the acceptable focusing range and/or at a fixed focusing distance.

The extension rod(s) of the focusing auxiliary device described in the above embodiments is coupled to and movable relative to the lens housing. The extension rod(s), however, can also be rearranged or additionally arranged on other positions such as side surface(s) 711 of the main housing 71.

From the above description, it is understood that the focusing auxiliary device of the present invention can be used to stabilize the camera so as to assure of a precise focusing distance and preventing from the rocking problem when a close-up shot is taken. Further, the indication of focusing distance via the present focusing auxiliary device with graduations provides useful information for the photographer.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A focusing auxiliary device of an image-capturing apparatus comprising:
   a lens housing arranged on the image-capturing apparatus, the lens housing having a generally cylindrical shape with a proximal end secured to the image-capturing apparatus and a distal end; and
   one or more extension rods engaging an outer wall of the lens housing and positioned to one side of the lens housing and movable relative to said lens housing for estimating a distance from the image-capturing apparatus to an object to be photographed, a portion of the one or more extension rods extending beyond the distal end of the lens housing.

2. The focusing auxiliary device according to claim 1 wherein said extension rods have thereon graduations for indicating said distance from the image-capturing apparatus to the object to be photographed.

3. The focusing auxiliary device according to claim 2 wherein the outer wall of said lens housing includes a track engaging with said extension rods, and a pointer for indicating a current graduation when said extension rods slide along said track.

4. The focusing auxiliary device according to claim 2 wherein the outer wall of said lens housing includes a track engaging with said extension rods.

5. The focusing auxiliary device according to claim 3 wherein said pointer is marked at a fixed position on the outer wall of said lens housing.

6. The focusing auxiliary device according to claim 3 wherein said track has a rack structure, and said extension rods have a resilient protrusion conforming to said rack structure to allow said extension rods to move along said track by an external force, and be stuck at a designated position when said external force is removed.

7. The focusing auxiliary device according to claim 6 further comprising a retaining bolt engaging with a threaded retaining hole of said extension rods, and optionally screwed tight to further stick said extension rods at said designated position.

8. A focusing auxiliary device of an image-capturing apparatus comprising:
   a lens housing arranged on the image-capturing apparatus, the lens housing having a generally cylindrical shape; and
   one or more extension rods coupled to and movable relative to said lens housing to become more protrusive than a lens set of the image-capturing apparatus, the one or more extension rods each having an elongate shape with a longest dimension thereof parallel to and offset from an axis of symmetry of the lens housing and located adjacent one side of an outer wall of the lens housing, wherein the extension rods are configured to resist a movement of the lens set toward a point where the extension rods are sustained against a supporting surface to keep the lens set of the image-capturing apparatus at or greater than a fixed distance from an object to be photographed.

9. The focusing auxiliary device according to claim 8 wherein said supporting surface is a surface where the object to be photographed is placed.

10. The focusing auxiliary device according to claim 8 further comprising a retaining member, wherein said fixed distance is adjustable by differentially moving said extension rods relative to said lens housing, and sticking said extension rods at a designated position on said lens housing with said retaining member.

11. The focusing auxiliary device according to claim 10 wherein said retaining member includes a bolt engaging with a threaded hole of said extension rods for sticking said extension rods at said designated position when being screwed tight into said threaded hole.

12. The focusing auxiliary device according to claim 8 wherein said extension rods have thereon graduations, and said lens housing includes a pointer for indicating a current graduation representing a distance from the lens set to said supporting surface while said extension rods move relative to said lens housing.

13. The focusing auxiliary device according to claim 12 wherein said lens housing includes a track engaging with said extension rods.

14. The focusing auxiliary device according to claim 13 wherein said pointer is marked at a fixed position on said lens housing.

15. The focusing auxiliary device according to claim 13 wherein said track has thereon a rack structure, and said extension rods have a resilient protrusion conforming to said rack structure to allow said extension rod to move relative to said lens housing by an external force, and be stuck at a designated position when said external force is removed.

16. The focusing auxiliary device according to claim 8 wherein said extension rods have a rounded free end for protecting said supporting surface from abrasion of said extension rods when said extension rods contacts said supporting surface.

17. The focusing auxiliary device according to claim 8 further comprising a protective sheath capping a free end of said extension rods for protecting said extension rods from abrasion of said supporting surface.

18. A focusing auxiliary device of an image-capturing apparatus comprising:
   a lens housing arranged on the image-capturing apparatus and having thereon a plurality of tracks, the lens housing having an outermost lens receiving light from a field of view without any intervening lens; and
   a plurality of extension rods coupled to and movable along said tracks such that the extension rods extend an adjustable distance into the field of view of the outermost lens, respectively, and protruding for sustaining against a supporting surface where the object to be photographed is placed so as to stabilize the image-capturing apparatus.

19. The focusing auxiliary device according to claim 18 comprising three tracks and three extension rods.

20. The focusing auxiliary device according to claim 18 wherein said extension rods are arranged to confine the object to be photographer therewithin.

* * * * *

UNITED STATES PATENT AND TRADEMARK OFFICE
CERTIFICATE OF CORRECTION

PATENT NO. : 7,430,012 B2  Page 1 of 1
APPLICATION NO. : 10/862283
DATED : September 30, 2008
INVENTOR(S) : Chang It is certified that error appears in the above-identified patent and that said Letters Patent is hereby corrected as shown below:

• In Column 6, line 36, change "contacts" to --contact--

• In Column 6, line 58, change "photographer" to --photographed--

Signed and Sealed this

Eleventh Day of August, 2009

David J. Kappos
*Director of the United States Patent and Trademark Office*